April 23, 1946.  F. B. ARPS  2,398,991
DUMP SCOOP ATTACHMENT FOR TRACTORS
Filed Sept. 18, 1944  3 Sheets-Sheet 1

INVENTOR:
FREDERICK B. ARPS
BY
ATTORNEY

April 23, 1946.   F. B. ARPS   2,398,991
DUMP SCOOP ATTACHMENT FOR TRACTORS
Filed Sept. 18, 1944   3 Sheets-Sheet 2

INVENTOR.
FREDERICK B. ARPS
BY
ATTORNEY

April 23, 1946. F. B. ARPS 2,398,991
DUMP SCOOP ATTACHMENT FOR TRACTORS
Filed Sept. 18, 1944 3 Sheets-Sheet 3

INVENTOR.
FREDERICK B. ARPS
BY A. S. Kroh
ATTORNEY

Patented Apr. 23, 1946

2,398,991

UNITED STATES PATENT OFFICE 2,398,991

DUMP SCOOP ATTACHMENT FOR TRACTORS

Frederick B. Arps, New Holstein, Wis., assignor to Arps Corporation, New Holstein, Wis., a corporation of Wisconsin Application September 18, 1944, Serial No. 554,657

5 Claims. (Cl. 37—126)

The present invention relates to a dump scoop attachment for tractors, the tractor having preferably a hydraulic lift with which to raise and lower the scoop.

The principal objects of the present invention are to provide a scoop which can be quickly attached and detached to the tractor, which is simple and easy to operate, durable and can be manufactured at low cost.

An object of my invention is to provide a scoop wherein the front end or cutting edge of the scoop is first lifted so as to break loose the soil or sod before the major weight of the scoop is lifted, and wherein the scoop is tilted back sufficiently to prevent any of the material from falling forward and out of the scoop while being lifted and transported.

Another object of the present invention is to provide a toggle joint for maintaining the loading and lifting positions of the scoop which may be broken manually for dumping the scoop.

A further object of the present invention is to provide means whereby the scoop will, at the proper time, automatically return to its loading position and will be automatically locked in this position until the beginning of the lifting operation.

Another object of the present invention is to provide a spring which will act as a cushion against extreme thrusts when the scoop is being loaded.

To these and other useful ends my invention consists of parts, combinations of parts or their equivalents and mode of operation as hereinafter described and claimed and shown in the accompanying drawings in which:

Fig. 4 is a fractional rear view of the inverted U shaped yoke, to the lower ends of which the scoop is pivoted.

Figure 1:
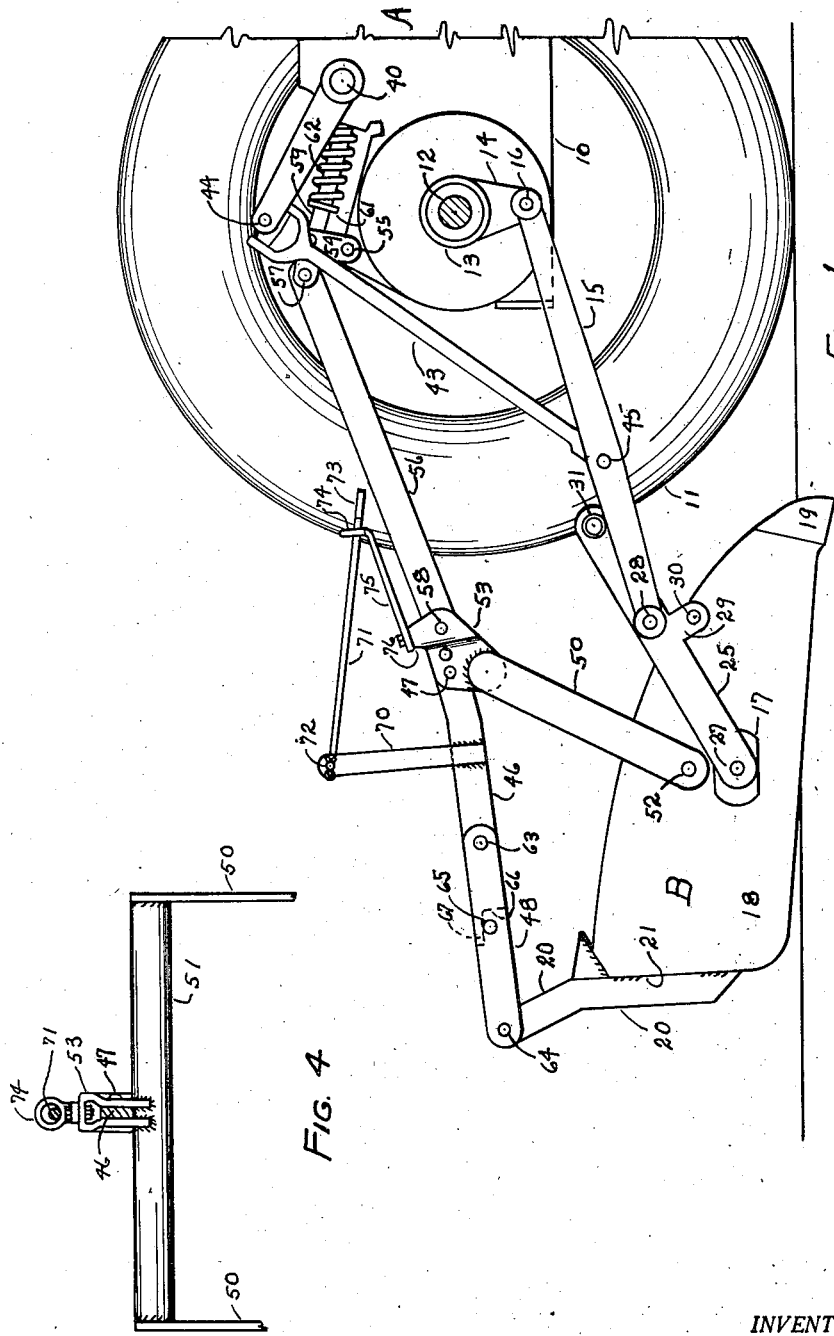
Fig. 1 is a side elevational view of my improved scoop in position for loading and shown attached to a conventional tractor, a fraction only of the tractor being shown.

As thus illustrated the tractor is designated by reference character A and the scoop by reference character B.

The frame of the tractor is designated by reference numeral 10, having rear carrying wheels 11—11 being secured to axle members 12 which extend to the differential in the housing of the tractor through axle housings 13—13. Each housing 13 has a depending bracket 14 to which draw-bars 15 are pivotally mounted as at 16. A strengthening plate 17 is secured to the side walls 18—18 of scoop B. The scoop is provided with a suitable cutting edge 19 at its forward end and a bracket 20 on its rear end 21. Member 20 at its upper end extends slightly rearwardly and a distance above member 21 as illustrated in Figures 1 and 2.

A supplemental draw-bar arrangement is provided in the form of an inverted U shaped member or yoke consisting of end members or arms 25—25, the upper ends being connected by means of a tube 26, the ends of which tube are preferably welded to the upper ends of members 25. The lower ends of members 25 are pivotally secured to members 17 as at 27 and the rear ends of draw-bars 15 are pivotally secured to members 25 as at 28.

Figure 2:
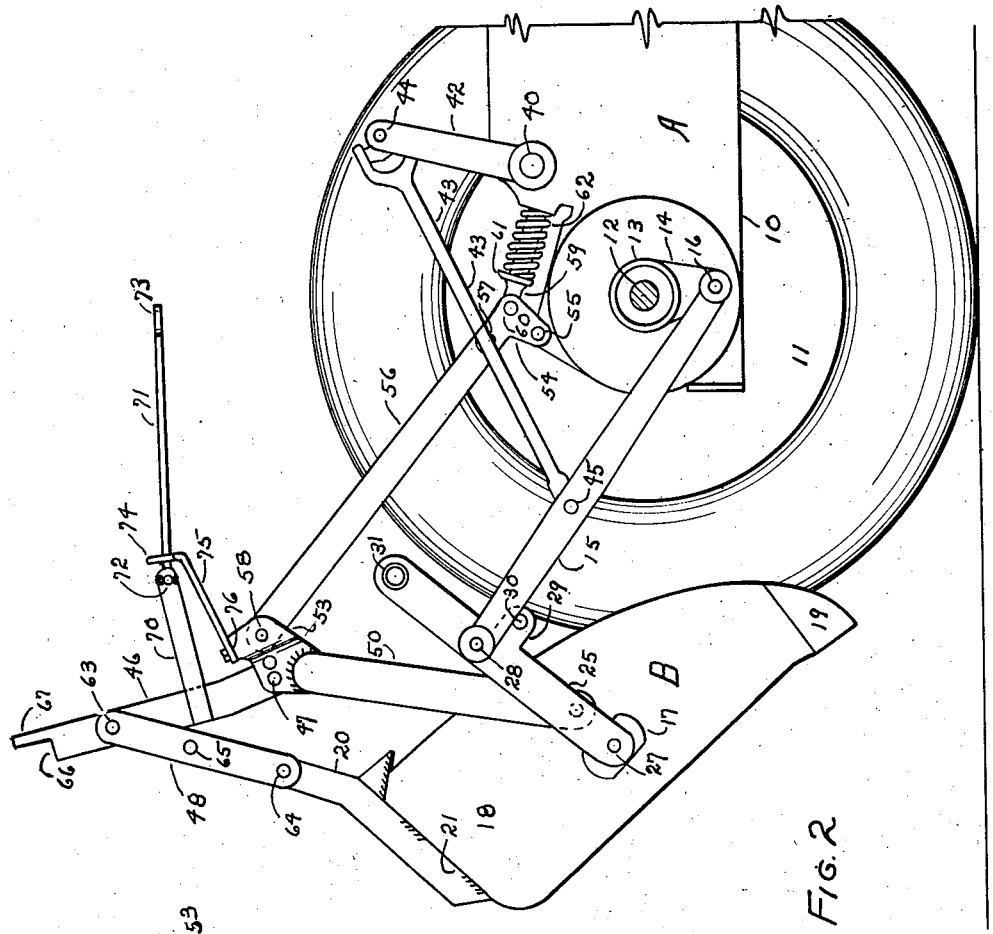
Fig. 2 is a view similar to Figure 1 except showing the scoop in a dumping position.

Pivot 28 is positioned about as shown in the figures and slightly above forwardly extending projection 29 (see Figure 2). These projections each have outwardly extending pins 30 which lie in the path of member 15 so as to limit the movement of members 25 relative to members 15 when the scoop is lifted.

On the upper end of members 25, I provide outwardly extending members 31 which lie in the path of draw-bar 15 when the scoop is in a loading position as illustrated in Fig. 1. Thus member 25 is limited in its movement on pivot 27 in both directions, the objects of which will hereinafter appear.

Tractor A is provided with a hydraulic power lift which is preferably mounted within housing 10, having a shaft 40 which protrudes through the housing extensions 41—41. I mount levers 42—42 on the ends of shaft 40 and form suitable connections between the free ends of lever 42 and draw-bars 15 by means of links 43—43 as at 44 and 45. Thus the power lift may be used for raising and lowering the rear ends of draw-bars 15.

I provide an inverted U shaped member comprising end members 50—50, the upper ends of which are secured together by means of a tube 51. Members 50 are at their lower ends pivoted to members 18 as at 52—52. On the upper side of member 51, I mount a bracket 53. I pivotally mount a bell-crank 54 on the engine housing 10 as at 55. The other end of the bell-crank is pivoted to a link 56 as at 57. The rear end of member 56 is pivoted to member 53 as at 58.

Bell-crank 54 is pivotally secured to a shaft 59 as at 60. This shaft has a collar 61 and a push spring 62 and means (not shown) for holding the front end of shaft 59 in a slidable position, the shaft being permitted to move forwardly against the pressure of the spring.

I provide a toggle joint between members 53 and 20 as follows:

A link 46 is pivoted to member 53 as at 47. A pair of links 48—48 lie on opposite sides of member 46 and are pivoted to this member as at 63. Links 48 also lie on the opposite sides of the upper end of member 20 and are pivoted thereto as at 64. A bolt 65 extends through members 48. The rear end of member 46 is cut away as at 66 (see Figure 2), forming a projection 67 which lies on member 65 when the scoop is in its loading and lifting positions. It will be noted that member 63 is slightly below the plane of members 47 and 64. Thus the distance between 47 and 64 is fixed unless member 65 is raised. This is done when it is desired to tip the scoop for unloading.

I secure a lever 70 to member 46 which is pivotally secured at its top to rod 71 as at 72. This rod extends forwardly and has a hand grip loop 73 at its front end. Rod 71 extends loosely through a loop 74, this loop having a rearwardly extending arm 75 which is secured to member 53 as at 76.

It will be noted that there are two holes in the rear of member 53. This number of holes may be increased. They are used for changing the down suck of the scoop when loading. It will also be noted that the scoop will be yieldingly held in one direction by spring 62 so that the cutting edge 19 may yield slightly when contacting very hard surfaces.

Figure 5:
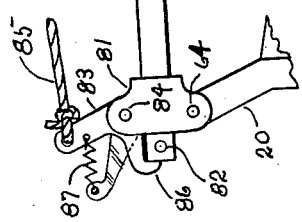
Fig. 5 illustrates a modification of the tipping device.
Figure 3:
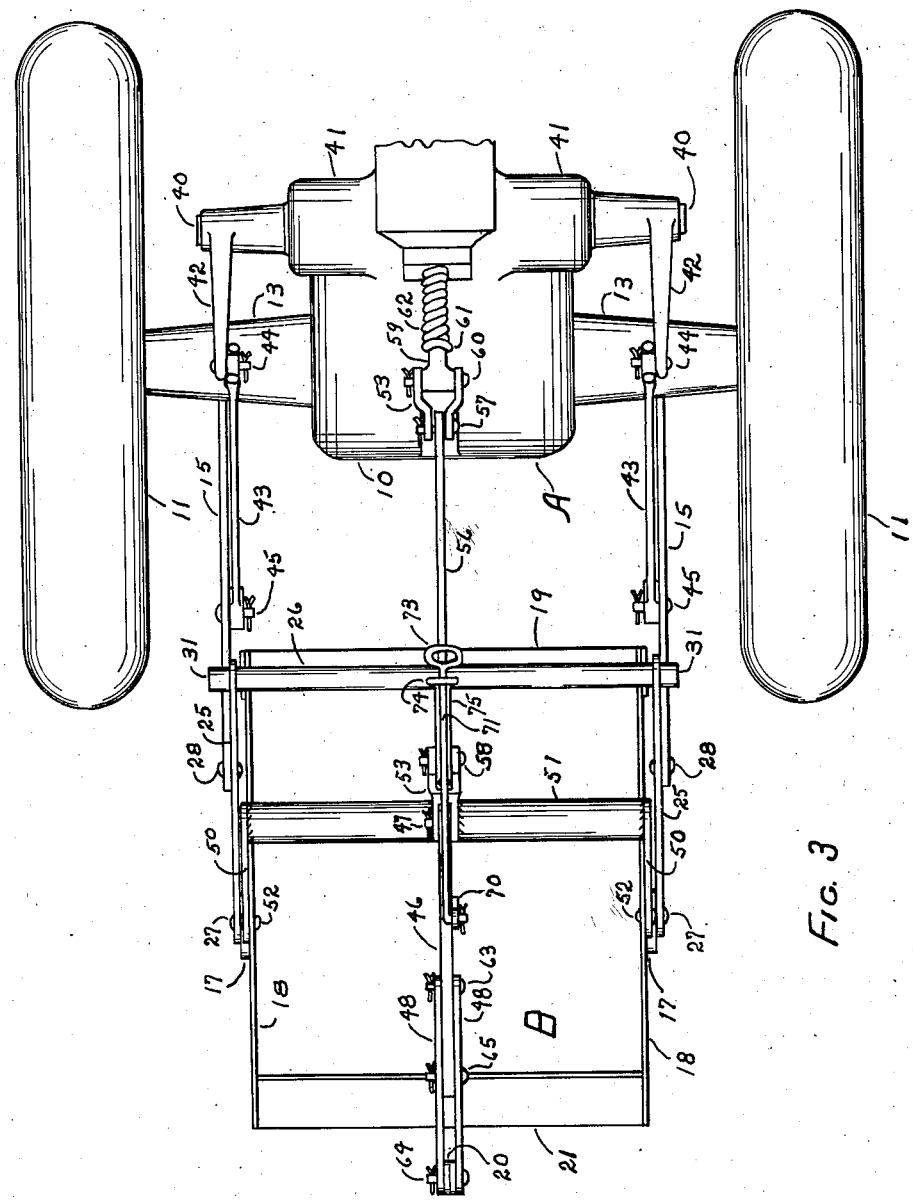
Fig. 3 is a top view of the device as illustrated in Figure 1.

In Figure 5 I illustrate a modification of the scoop holding and tripping device. In this device a single link 80 takes the place of members 46 and 48 and the means for tripping the same. A block 81 is slidably mounted on member 80 and pivotally connected to member 20 as in the other design. Near the rear end of member 80 I provide a pin 82 which limits the rearward movement of block 81. A bell crank 83 is pivoted to member 81 as at 84, the upper end having a rope 85 which extends to within reach of the tractor operator. Bell crank 83 at its other end is provided with a hook 86 adapted to engage the end of member 80 when the scoop is being loaded and lifted for transportation. A spring 87 is provided and anchored to members 81 and 83 as shown.

The operation of my device is as follows:

When scoop B is being loaded, members 15 and 25 will be in the position shown in Figure 1 and at this time they will act similar to a rigid draw-bar between pivots 16 and 27 and the scoop will be held in the position shown because of spring 62. After loading, when it is desired to lift the scoop by means of the hydraulic mechanism, the forward end of member 25 will first be raised, thus shortening the distance between members 16 and 27 until pin 30 contacts member 15 (see Figure 2). This will result in first raising the front end of the scoop and breaking the dirt or sod at the cutting edge of the scoop before the rear end of the scoop is lifted from the ground, thus tilting the scoop backward somewhat and preventing any of the dirt on the scoop from falling forward. A further movement of the lift will raise the scoop without materially changing its horizontal position and the tractor may then be driven to the unloading place.

When it is desired to unload, the operator may pull on hand loop 73 thus unlocking the toggle joint and permit the scoop to tilt to the position shown in Figure 2. This unloading operation may take place with the scoop at any desired height. If it is desired to spread the dirt, then the scoop is dumped when in a position so the front end will drag some of the dirt forward as the tractor is moved forward.

One of the advantages of applicant's design is that it gives the operator manual control over the scoop because the scoop may be dumped at will and at any place or in any position. Also, by pushing on loop 73 the scoop may be positively forced into its loading position. In fact, the operator has almost complete control over the scoop. Furthermore the toggle joint will not wear, will always lock when desired and can be unlocked easily by a slight pull on hand loop 73.

The operation of the scoop when equipped with the tilting device shown in Figure 5 will obviously be the same as in the other figures except that a pull rope is provided instead of the hand piece 73 and its connections to link 46.

Having thus shown and described my invention, I claim:

1. In combination, a tractor having a pair of rearwardly extending draw-bars pivotally attached thereto, means for raising and lowering the rear ends of the draw-bars, a scoop having side walls, an inverted U-shaped frame having its side legs straddling the scoop with the lower ends of the legs pivoted to said side walls, a pivotal connection between the rear ends of the draw-bars and said legs, abutment means on the legs of the U-shaped frame at opposite sides of the draw-bars but spaced therefrom and respectively engageable with the draw-bars for holding the scoop in loading position and for arresting pivotal movements between the draw-bars and side legs of the U-shaped frame when the scoop is elevated, and means extending between the tractor and the rear end of the scoop for controlling the position of the scoop.

2. In combination, a tractor having a pair of rearwardly extending draw-bars pivotally attached thereto, means for raising and lowering the rear ends of the draw-bars, a scoop having side walls, an arm at each side of the scoop with the lower ends of the arms pivoted to said side walls, a pivotal connection between the rear ends of the draw-bars and said arms, abutment means on the arms at opposite sides of the draw-bars but spaced therefrom and respectively engageable with the draw-bars for holding the scoop in loading position and for arresting pivotal movements between the draw-bars and said arms when the scoop is elevated, and means extending between the tractor and the rear end of the scoop for controlling the position of the scoop.

3. In combination, a tractor having a pair of rearwardly extending draw-bars pivotally attached thereto, means for raising and lowering the rear ends of the draw-bars, a scoop having side walls, supplemental draw-bars having their rear ends pivoted to said side walls of the scoop, the first named draw-bars being pivoted at their rear ends to said supplemental draw-bars intermediate the ends of the latter, abutment means on said supplemental draw-bars on opposite sides of the first named draw-bars but spaced therefrom and respectively engageable therewith for holding the scoop in loading position and for arresting pivotal movement between the draw-bars when the scoop is elevated, and means extending between the tractor and the rear end of the scoop for controlling the position of the scoop.

4. In combination, a tractor having a pair of rearwardly extending draw-bars pivotally attached thereto, means for raising and lowering the rear ends of the draw-bars, a scoop having side walls, an arm at each side of the scoop with the lower ends of the arms pivoted to the side walls of the scoop, a pivotal connection between the rear ends of the draw-bars and said arms, abutment means associated with said draw-bars and arms and located at opposite sides of the draw-bars, respectively for holding the scoop in loading position and for arresting pivotal movements between the draw-bars and said arms when the scoop is elevated, and means extending between the tractor and the rear end of the scoop for controlling the position of the scoop.

5. In combination, a tractor having a pair of rearwardly extending draw-bars pivotally attached thereto, means for raising and lowering the rear ends of the draw-bars, a scoop having side walls, an arm at each side of the scoop with the lower ends of the arms pivoted to said side walls, a pivotal connection between the rear ends of the draw-bars and said arms, abutment means on the arms at opposite sides of the draw-bars but spaced therefrom and respectively engageable with the draw-bars for holding the scoop in loading position and for arresting pivotal movements between the draw-bars and said arms when the scoop is elevated, and means for controlling the position of the scoop including an inverted U-shaped bracket having side legs straddling the scoop with the legs pivoted to the side walls of the scoop, a link connection between the upper ends of the U-shaped bracket and the tractor and link connections between the upper end of the U-shaped bracket and the rear end of the scoop.

FREDERICK B. ARPS.